(12) United States Patent
Masselle et al.

(10) Patent No.: US 7,986,300 B2
(45) Date of Patent: Jul. 26, 2011

(54) AUTONOMIC CONTROL OF CALIBRATION FOR POINTING DEVICE

(75) Inventors: Eric L. Masselle, Raleigh, NC (US); William G Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1608 days.

(21) Appl. No.: 11/319,882

(22) Filed: Dec. 28, 2005

(65) Prior Publication Data
US 2007/0146319 A1 Jun. 28, 2007

(51) Int. Cl.
*G06F 3/033* (2006.01)
*G09G 5/08* (2006.01)

(52) U.S. Cl. .......................... 345/157; 345/159

(58) Field of Classification Search .................. 345/156, 345/157, 159, 163, 167, 168, 173
See application file for complete search history.

(56) References Cited

U.S. PATENT DOCUMENTS

| | | | | |
|---|---|---|---|---|
| 4,782,327 | A * | 11/1988 | Kley et al. | 341/2 |
| 4,903,012 | A * | 2/1990 | Ohuchi | 345/178 |
| 6,078,308 | A | 6/2000 | Rosenberg et al. | |
| 6,100,874 | A | 8/2000 | Schena et al. | |
| 6,288,705 | B1 | 9/2001 | Rosenberg et al. | |
| 7,289,107 | B1 * | 10/2007 | Straayer et al. | 345/161 |
| 2002/0105553 | A1 * | 8/2002 | Segre | 345/862 |
| 2004/0245227 | A1 * | 12/2004 | Grafton-Reed et al. | 219/121.83 |

OTHER PUBLICATIONS

Yang, Zhen, et al; *Automatic Micro Flow Rate Measurement Using a Modified Computer Mouse Device*; 1st Annual Internat'l IEEE-EMBS Special Topic Conference on Microtechnologies in Medicine & Biology; Oct. 12-14, 2000, Lyon France.
Hwang, Faustina, et al; *Perception and Haptics: Towards More Accessible Computers for Motion-Impaired Users*; PUI 2001, Orlando FL.
Zhang, Zhengyou, et al; *Visual Panel: Virtual Mouse, Keyboard and 3D Controller with an Ordinary Piece of Paper*; PUI 2001, Orlando, FL.
Hinckley, Ken, et al; *Interaction and Modeling Techniques for Desktop Two-Handed Input*; UIST '98, San Francisco, CA.
IBM Technical Disclosure Bulletin; vol. 36, No. 04, Apr. 1993; *Method for Simplifying the Accurate Positioning of a Mouse Pointer*.

* cited by examiner

*Primary Examiner* — Ricardo L Osorio
(74) *Attorney, Agent, or Firm* — Steven M. Greenberg, Esq.; Carey, Rodriguez, Greenberg & Paul

(57) ABSTRACT

A computer system includes a computer, a calibration module, an event detection module, and an application interface module. The computer executes one or more applications and receives pointing device events generated by a pointing device connected to the computer. The calibration module modifies a rate of movement of a cursor displayed by the computer in response to the pointing device events. The event detection module detects a less-than-optimal calibration indicator from the pointing device events and modifies the rate of movement of the cursor. The application interface module communicates with the application being performed on the computer. A storage module for storing calibration information may also be included.

10 Claims, 3 Drawing Sheets

AUTONOMIC CONTROL OF CALIBRATION FOR POINTING DEVICE

BACKGROUND OF THE INVENTION

1. Field of the Invention

The disclosure relates generally to computer systems and, more specifically, to a method and system for controlling the calibration of movements associated with pointing device events.

2. Description of the Related Art

Computer systems have become increasingly interactive with computer users. The advent of the personal computer provided a dedicated computer, keyboard, and a display device, such as a monitor, to nearly every computer user. Further developments in operating systems such as graphical user interfaces and multimedia support have resulted in a highly interactive experience for computer users. Pointing devices such as mice, light pens, digitizing tablets, trackballs, touch pads, and touch screens have provided the user with additional control and interactivity. In the future, data gloves and gesture recognition are expected to further improve the ability of the user to point to objects or commands that the user wishes to process.

The movement of pointing device by a user generates pointing device events. These pointing device events are used by the computer system and interact with various applications/drivers/modules operating within the computer system. Once such interaction is to control the movement of a cursor, which itself may interact with the various applications/driver/modules operating within the computer system. Since pointing devices are controlled by a user (e.g., via the movement of a hand), a recognized need has been to customize how the movement of the cursor reacts to the movement of the pointing device by the user.

One commonly used device for customizing the movement of the cursor is with a pointing device interface module. In certain instances, the rate at which the cursor moves is defined as pixels (of the display device) per a defined length in a particular direction of movement by the pointing device (e.g., 300 horizontal pixels of resolution per 1 inch of horizontal movement of the pointing device). With the pointing device interface module, a user is able to select (e.g., sliding a slider back and forth) a particular rate at which the cursor is moved. Typically, the user decides upon a particular rate based upon trial and error.

There are, however, many issues associated with this trial and error process. Many users do not have the sophistication to operate the pointing device interface module, and even if they did, may not have the sophistication to select an optimal rate. Furthermore, even if the optimal rate of movement of the cursor was optimally selected by the user, this optimal rate of movement may change over time depending upon external factors (e.g., restrictions placed on a user's movement). Additionally, the optimal rate of movement of the cursor may vary depending upon a change in the particular application/module with which the cursor is interacting and/or a change in the screen resolution of the display. However, conventional pointing device interface modules are not capable of easily reacting to these changes. There is, therefore, a need for an apparatus, method, and system that can autonomously select an optimal rate of movement of the cursor and react to subsequent changes.

BRIEF SUMMARY OF THE INVENTION

Embodiments of the invention address deficiencies of the art in respect to location systems and provide a novel and non-obvious method and system for autonomously selecting an optimal rate of movement of the cursor. The computer system includes a computer, a calibration module, an event detection module, and an application interface module. The computer executes one or more applications and receives pointing device events generated by a pointing device connected to the computer. The calibration module modifies a rate of movement of a cursor displayed by the computer in response to the pointing device events. The event detection module detects a less-than-optimal calibration indicator from the pointing device events and modifies the rate of movement of the cursor. The application interface module communicates with the application being performed on the computer. A storage module for storing calibration information may also be included.

In certain aspects, the storage module stores calibration information for a class of applications. Also, the event detection module automatically reviews the received pointing device events and automatically modifies the rate of movement of the cursor based upon the detected indicator. Furthermore, the application interface module may receive calibration information from the applications.

In additional aspects, a method for calibrating a rate of movement of the cursor displayed by the computer in response to the pointing device connected to the computer includes the steps of: requesting a user to operate the pointing device to indicate a natural range of motion of the user while operating the pointing device; receiving pointing device events from the pointing device while the user is operating the pointing device; defining the natural range of motion of the user from the pointing device events; calculating a dimension from the defined natural range of motion; and defining the rate of movement of the cursor using the dimension.

A plurality of dimensions may be calculated from the defined range of motion. Additionally, a plurality of rates of movement of the cursor may b defined. The rate of movement may be defined using a number of pixels in a display device of the computer. Also, the dimension is calculated using diameters of a plurality of cross-sections of the defined range of motion.

In yet another aspect, a method for autonomously modifying the rate of movement of a cursor displayed by the computer in response to the pointing device connected to the computer, includes the steps of: receiving pointing device events from the pointing device; detecting a less-than-optimal calibration indicator for the pointing device events; and autonomously modifying the rate of movement of the cursor based upon the detected indicator. If the indicator is defined by the cursor moving beyond a boundary of a display area of the computer; the rate of movement of the cursor is modified to decrease the rate of movement. If the indicator is defined by a plurality of successive long strokes in substantially the same direction; the rate of movement of the cursor is modified to increase the rate of movement. If the indicator is defined by a stroke greater than a dimension describing a normal range of motion for a user of the pointing device; the rate of movement of the cursor is modified to increase the rate of movement. The modification may occur after a defined number of similar indicators have been detected.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
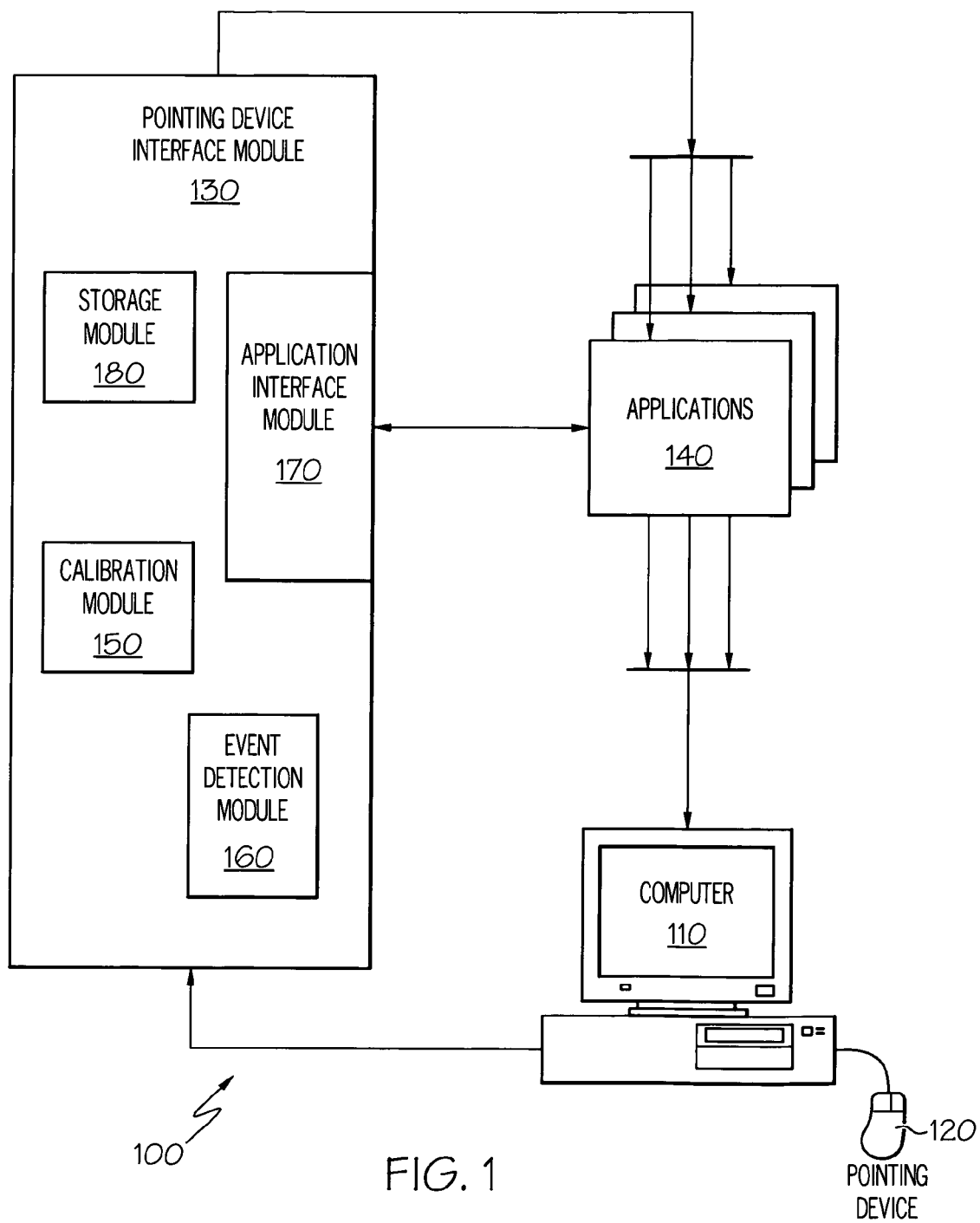
FIG. 1 is a block diagram of a computer system in accordance with the inventive arrangements.

FIG. 1 illustrates a computer system 100 including a computer 110, a pointing device 120, a pointing device interface module 130, and one or more applications 140 executed on the computer 110. The pointing device 120 generates pointing device events, which are received by the pointing device interface module 130. These pointing device events may be transmitted directly to the applications 140 or, in certain aspects of the computer system 100, transmitted to the applications 140 via the pointing device interface module 130. The pointing device interface module 130 may also include a calibration module 150, an event detection module 160, an application interface module 170, and a calibration information storage module 180.

The pointing device 120 facilitates selecting user interface elements and inputting spatial data into the computer 110. The pointing device 120 may generate pointing device events, which are received by the pointing device interface module 130. A pointing device 120 may be used with a graphical user interface to enable a user to control and provide data to the computer 110. For example, the pointing device 120 may facilitate expression of physical gestures such as "point," "click," and "drag," which result in predictable actions by the computer 110. Movements of the pointing device 120 may be emulated on the computer screen by a cursor. Representative pointing devices 120 include a mouse, a pen, a digitizing tablet, a trackball, a touch pad, a pointing stick, a data glove, and a gesture recognizer.

Many of the functional units described in this specification have been labeled as modules, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The calibration module 150 may be activated manually (e.g., by a user), autonomously (e.g., via the event detection module 160), or by an application 140 (e.g., via the application interface module 170). The calibration module 150 may be activated manually by a user using, for example, a mouse configuration utility.

Figure 2:
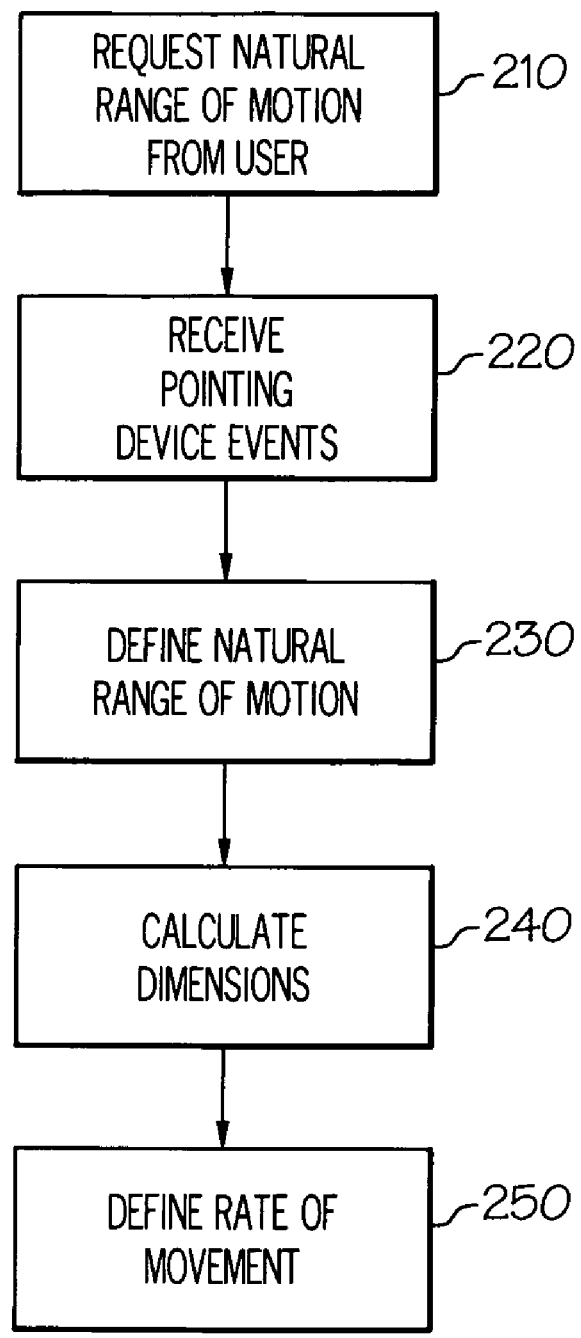
FIG. 2 is a flow chart diagram illustrating a method of generating calibration information in accordance with the inventive arrangements.

An exemplar process for performing a calibration is illustrated in FIG. 2. In step 200, the calibration module 150 may communicate to the user a request that the user operate the pointing device 120 using movements that define the user's natural range of motion of the pointing device 120. For example, if the pointing device 120 is a mouse, they user may be instructed to naturally rest the user's hand on top of the mouse and click one of the mouse's buttons (e.g., the left button) to initiate the calibration process. The user is then instructed to move the mouse around in large circles without lifting the user's wrist from the surface upon which the mouse rests. In step 210, while the user is operating the pointing device 120, the calibration module 150 receives, from the pointing device, pointing device events that indicate the extent of movement by the pointing device 120 as a result of the user's natural range of motion.

After the user has finished indicating the user's natural range of motion using the pointing device 120, for example by clinking one of the mouse's buttons or after a predetermined amount of time, in step 220, the extent of the user's natural range of motion using the pointing device 120 is defined, and the calibration module 150 is not limited in the manner in which the extent of the user's natural range of motion using the pointing device 120 is defined. For example, when the pointing device 120 is a mouse, the range of motion may be defined by an area bounded by locations associated with the pointing device events received during step 210.

In step 230, depending upon the type of pointing device 120, one or more dimensions are calculated using the range of motion defined in step 220. For example, if the pointing device 120 is a mouse two dimensions (horizontal and vertical) or one dimension (a combination of horizontal and vertical dimension) may be defined. As used herein, the terms horizontal and vertical do not necessarily connote an absolute coordinate system. As another example, if the pointing device 120 is a data glove, three dimensions may be defined. Each of the calculated dimensions may be a specific statistical representation (e.g., average, mean, etc.) of the extent of the range of motion in one or more directions.

Figure 3:
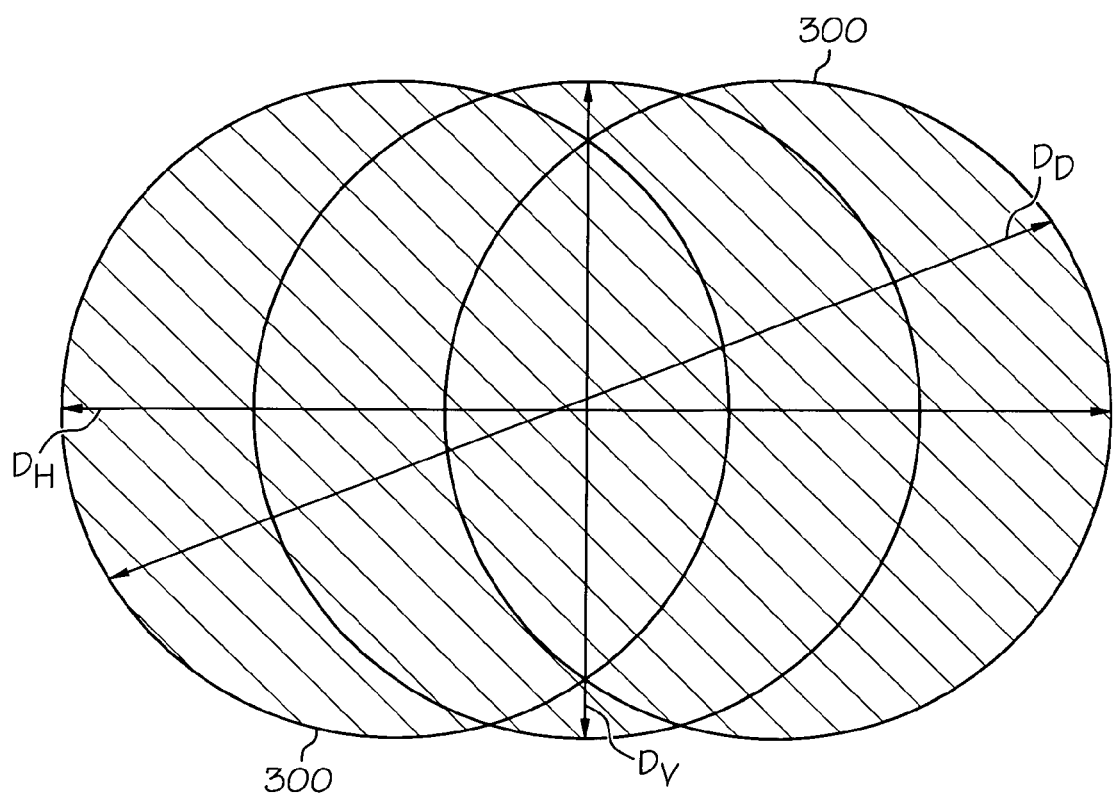
FIG. 3 illustrates a natural range of motion when using a pointing device.

For example, when the pointing device 120 is a mouse, a single dimension may be calculated using the diameters of one or more cross-sections of the defined range of motion. FIG. 3 illustrates an example in which three diameters $D_V$, $D_H$, and $D_D$ are used to calculate a single dimension $D_S$ for a range of motion 300. When using three diameters, for example, one diameter may be calculated from a horizontal diameter $D_H$, a second diameter may be calculated from a vertical diameter $D_V$, and a third diameter may be calculated from a diagonal diameter $D_D$. These three diameters $D_V$, $D_H$, and $D_D$ may then be averaged together to determine a single dimension $D_S$ for a range of motion 300. Alternatively, two dimensions (horizontal and vertical) for the range of motion 300 may respectively be determined using the horizontal diameter $D_H$ and the vertical diameter $D_V$.

After the one or more dimensions have been calculated for the range of motion, in step 240, the rate of movement of a cursor is defined in step 250. Although not limited in this specific manner, in certain aspects of the calibration module 150, the rate at which the cursor moves is defined as pixels (of a display device) per a specific dimension in a particular direction. The rate is calculated by dividing the specified dimension into the number of pixels, of the display device, along the particular direction.

One or more rates of movement of the cursor may be defined. For example, if the pointing device 120 is a mouse, a single rate of movement of the cursor may be defined. Alternatively, the rates of horizontal movement and vertical movement of the cursor may be defined separately. Additionally, if the rates of horizontal and vertical movement are defined separately, these rates may be defined using different dimensions (e.g., a horizontal dimension for the horizontal rate and a vertical dimension for a vertical rate) and/or different numbers of pixels (e.g., the number of pixels of the display device in a horizontal direction may be different from the number of pixels of the display device in the vertical direction).

For example, the horizontal rate for a mouse may be calculated as: horizontal pixels of the display divided by the horizontal dimension (i.e., $D_H$) determined in step 230. In another aspect, the horizontal rate for a mouse may be calculated as: horizontal pixels of the display divided by the single dimension (i.e., $D_S$). Where only a single rate of movement of the cursor is calculated, the single rate of movement of the cursor may be calculated based upon the larger number of the horizontal and vertical pixels (typically, the horizontal pixels) and the single dimension (i.e., $D_S$) or the horizontal dimension (i.e., $D_H$). As evident to one skilled in the art, many different techniques and/or algorithms may be employed to calculate the one or more optimal rates of movement of the cursor within step 250.

The calculated rates may also be modified by predetermined constant or a constant chosen by the user (i.e., "fudge factor"). For example, these modifications may compensate for other factors the affect the calculation of optimal cursor rate, such as eye tracking problems. Once the one or more optimal rates of movement of the cursor are calculated, these rates may be stored in the calibration information storage module 180.

The application interface module 170 is typically an operating system process that ensures orderly access to the pointing device 120 and any drivers or modules associated therewith. The application interface module 170 may provide pointing device events, or events and information associated therewith, to the applications 140. The applications 140 process the events and information provided by the application interface module 170 and determine what feedback will be provided to the user. Such feedback may involve accessing several layers of software before actual feedback is presented to the user.

The application interface module 170 may also receive a request from an application 140 for calibration information from the calibration information storage module 180 of the pointing device interface module 130. Additionally, the application interface module 170 may receive calibration information from an application 140 and store that information in the calibration information storage module 180. Depending upon the particular application 140, and the manner in which the pointing device 120 interacts with the application 140, the application 140 may provide a default calibration for use with the pointing device 120. In other instances, the application 140 may invoke the calibration module 150 to generate calibration information specifically for the application 140. In still other instances, calibration information for the application 140 may already be pre-loaded into the calibration information storage module 180.

In still other instances, an application 140 may be associated with an entire class of applications for which calibration information may already be obtained. In this situation, the application 140 may interact with the application interface module 170 to determine if the calibration information associated with the entire class of applications has already been obtained. If so, that calibration information may be used; and if no, the calibration module 150 may be invoked to generate calibration information that may be applied to applications 140 associated with an entire class of applications.

In all these instances, the calibration information can be optimized for a specific application 140. This calibration information, for example, may be the default calibration information, calibration information obtained by the application 140, calibration information associated with a class of applications, or calibration pre-loaded into the calibration information storage module 180 and associated with the application 140. As an user interacts with various applications 140, these applications 140 may communicate with the application interface module 170 to determine the desired calibration for the particular application 140.

The event monitoring module 160 monitors the pointing device events, as generated by the pointing device 120, and interacts with the application interface module 170 to modify the calibration. For example, the user (or an application 140) may change the display resolution. In such an instance, the event monitoring module 160 may change the rates of movement of the cursor to reflect the change in resolution. A change in resolution can also result from the user adding (or subtracting) the number of displays being used with the computer 110. For example, many computers 110 are capable of support more than one display.

Another function of the event monitoring module 160 may be to monitor the pointing device events for indicators of less-than-optimal calibration. For example, one set of pointing device events indicating less-than-optimal calibration is a number of successive long strokes (e.g., greater than ½ a length of the calculated dimension) in substantially the same direction (e.g., within ±15°). This indicates that the user in unable to move the cursor to a desired location in a single stroke and the rate of movement of the cursor should be increased. Another indicator is when the user generates strokes that are greater than the dimension describing the normal range of motion for the user, which also indicates that the rate of movement should be increased. Alternatively, if the cursor consistently moves beyond the boundaries of the display area, this indicates that the rate of movement of the cursor is set too high, thereby causing the cursor to overshoot.

The event monitoring module 160 may store these indicators in the storage module 180, and based upon a predetermined algorithm (e.g., after a defined number of similar indicators have been detected), may change the calibration. For example, the event monitoring module 160 may either automatically adjust (up or down) the rate of movement of the cursor. Alternatively, the event monitoring module 160 may invoke the calibration module 150 to recalibrate the movement of the pointing device 120. The adjustments to the calibration, for example, may be made to a default calibration and/or a calibration associated with a particular application 140 (or classes of applications 140) and stored within the storage module 180.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for calibrating a rate of movement of a cursor displayed by a computer in response to a pointing device connected to the computer comprising the steps of:
    requesting a user to operate the pointing device to indicate a natural range of motion of the user while operating the pointing device;
    receiving pointing device events from the pointing device while the user is operating pointing device;
    defining the natural range of motion of the user from the pointing device events;
    calculating a dimension from the defined natural range of motion;
    defining the rate of movement of the cursor using the dimension;
    receiving additional pointing device events from the pointing device;
    detecting a less-than-optimal calibration indicator for the additional pointing device events; and
    autonomously modifying the rate of movement of the cursor based upon the detected indicator.

2. The method according to claim 1, wherein
    the indicator is defined by the cursor moving beyond a boundary of a display area of the computer; and
    the modification of the rate of movement of the cursor is to decrease the rate of movement.

3. The method according to claim 1, wherein
    the indicator is defined by a plurality of successive long strokes in substantially the same direction; and
    the modification of the rate of movement of the cursor is to increase the rate of movement.

4. The method according to claim 1, wherein
    the indicator is defined by a stroke greater than a dimension describing a normal range of motion for a user of the pointing device; and
    the modification of the rate of movement of the cursor is to increase the rate of movement.

5. The method according to claim 1, wherein
    the autonomously modifying occurs after a defined number of similar indicators have been detected.

6. A computer program product comprising a computer usable storage medium having stored therein computer usable program code for calibrating a rate of movement of a cursor displayed by a computer in response to a pointing device connected to the computer, the computer usable program code, which when executed by the computer, causes the computer to perform:
    requesting a user to operate the pointing device to indicate a natural range of motion of the user while operating the pointing device;
    receiving pointing device events from the pointing device while the user is operating pointing device;
    defining the natural range of motion of the user from the pointing device events;
    calculating a dimension from the defined natural range of motion;
    defining the rate of movement of the cursor using the dimension;
    receiving additional pointing device events from the pointing device;
    detecting a less-than-optimal calibration indicator for the additional pointing device events; and
    autonomously modifying the rate of movement of the cursor based upon the detected indicator.

7. The computer program product according to claim 6, wherein
    the indicator is defined by the cursor moving beyond a boundary of a display area of the computer; and
    the modification of the rate of movement of the cursor is to decrease the rate of movement.

8. The computer program product according to claim 6, wherein
    the indicator is defined by a plurality of successive long strokes in substantially the same direction; and
    the modification of the rate of movement of the cursor is to increase the rate of movement.

9. The computer program product according to claim 6, wherein
    the indicator is defined by a stroke greater than a dimension describing a normal range of motion for a user of the pointing device; and
    the modification of the rate of movement of the cursor is to increase the rate of movement.

10. The computer program product according to claim 6, wherein
    the autonomously modifying occurs after a defined number of similar indicators have been detected.

* * * * *